United States Patent
Koo

(10) Patent No.: US 11,385,754 B2
(45) Date of Patent: Jul. 12, 2022

(54) TOUCH SENSOR IN WHICH PCAP METHOD AND EMR METHOD ARE COMBINED

(71) Applicant: AHAINC CO., LTD., Gimpo-si (KR)

(72) Inventor: Gi Do Koo, Goyang-si (KR)

(73) Assignee: AHAINC CO., LTD., Gimpo-si (KR)

( * ) Notice: Subject to any disclaimer, the term of this patent is extended or adjusted under 35 U.S.C. 154(b) by 0 days.

(21) Appl. No.: 17/418,372

(22) PCT Filed: May 15, 2019

(86) PCT No.: PCT/KR2019/005830
§ 371 (c)(1),
(2) Date: Jun. 25, 2021

(87) PCT Pub. No.: WO2020/017748
PCT Pub. Date: Jan. 23, 2020

(65) Prior Publication Data
US 2022/0066596 A1 Mar. 3, 2022

(30) Foreign Application Priority Data

Jul. 17, 2018 (KR) .......................... 10-2018-0083164

(51) Int. Cl.
*G06F 3/044* (2006.01)
*G06F 3/041* (2006.01)
*G06F 3/046* (2006.01)

(52) U.S. Cl.
CPC ............ *G06F 3/0446* (2019.05); *G06F 3/046* (2013.01); *G06F 3/0412* (2013.01); *G06F 3/0416* (2013.01); *G06F 2203/04106* (2013.01)

(58) Field of Classification Search
CPC .... G06F 3/0446; G06F 3/0412; G06F 3/0416; G06F 3/046; G06F 2203/04106
See application file for complete search history.

(56) References Cited

U.S. PATENT DOCUMENTS

2004/0105040 A1* 6/2004 Oh .......................... G06F 3/046
349/12
2013/0076670 A1* 3/2013 Wu ........................ G06F 3/0446
345/173
(Continued)

FOREIGN PATENT DOCUMENTS

JP 4915232 4/2012
KR 10-2009-0072966 7/2009
(Continued)

*Primary Examiner* — Liliana Cerullo
(74) *Attorney, Agent, or Firm* — Lex IP Meister, PLLC

(57) ABSTRACT

An objective of the present invention is to provide a touch sensor using both a projected capacitive (PCAP) and an electro-magnetic resonance (EMR) method in a display device. To this end, provided is a touch sensor using a PCAP method and an EMR method using a copper mesh, the touch sensor including a panel unit capable of performing touch recognition by using both the PCAP method and the EMR method and a sensor unit for determining a touch method when the panel unit is touched and performing the touch recognition according to the touch method, wherein the panel unit includes: a first panel of the PCAP method; and a second panel of the EMR method, and the sensor unit includes: a first panel driving unit operating the first panel; a second panel driving unit operating the second panel; and a control unit for detecting a capacitance change of the first panel via the first panel driving unit, detecting a magnetic field change of the second panel via the second panel driving unit, and determining the capacitance change and the magnetic field change to thereby determine whether to operate the first panel driving unit or the second panel driving unit simultaneously or selectively, and wherein an electrode pattern of the first panel or an antenna loop pattern of the second panel is formed of the copper mesh.

5 Claims, 3 Drawing Sheets

(56) References Cited

U.S. PATENT DOCUMENTS

2017/0371491 A1* 12/2017 Horikoshi ............... G06F 3/041
2018/0113528 A1*  4/2018 Xi .......................... G06F 3/0445
2019/0004666 A1*  1/2019 Jiang ..................... G06F 3/0442

FOREIGN PATENT DOCUMENTS

| KR | 10-2011-0057385 | 6/2011 |
| KR | 10-1209514 | 12/2012 |
| KR | 1020120138086 | 12/2012 |
| KR | 1020140051649 | 5/2014 |
| KR | 10-2014-0129805 | 11/2014 |
| KR | 1020150104334 | 9/2015 |
| KR | 10-1618286 | 5/2016 |

* cited by examiner

TOUCH SENSOR IN WHICH PCAP METHOD AND EMR METHOD ARE COMBINED

TECHNICAL FIELD

The present invention relates to a touch sensor in which a projected capacitive (PCAP) method and an electro-magnetic resonance (EMR) method are combined.

BACKGROUND ART

Two methods, i.e., a projected capacitive (PCAP) method and an electro-magnetic resonance (EMR) method, are roughly used to sense touch in touchscreens.

First, in sensing using the projected capacitive (PCAP) method, a change in capacitance occurring when a human body or a specific object contacts the surface of a touchscreen is sensed. A difference between a subtle change in capacitance occurring when the human body contacts the touch surface of the touchscreen and a set value is detected, and a final output is generated. A part of the touchscreen which contacts a touch sensor is formed of a metal and, when a small amount of current flows to this part, the part is in a standby state. At this time, when a user puts his/her hand on a switch, current runs through the user's body, voltage changes in a short time, and an output of a circuit in the touchscreen is changed in response to the voltage.

In sensing using the electro-magnetic resonance (EMR) method, a coil installed in a stylus pen senses pressure, speed and coordinate information of the stylus pen while transceiving frequencies in a specific region output by a terminal sensor. In more detail, when subtle energy of a resonance circuit of the stylus pen is induced in a magnetic field generated in a surface sensor board, the resonance circuit of the stylus pen may return a magnetic signal to the sensor board using this energy. A sensor unit having coils formed on the surface thereof and the stylus pen having the resonance circuit provided therein are provided.

Sensing using the projected capacitive (PCAP) method and sensing using the electro-magnetic resonance (EMR) method are executed in different ways, and thus, it is difficult to implement the two methods in one touchscreen.

Further, an indium tin oxide (ITO) film has been widely used in a film sensor of a conventional capacitive touch panel (hereinafter, being referred to a touch panel), but, due to increase in manufacturing costs depending on the recent trend to increase the size of displays, use of non-ITO-based transparent conductive films (hereinafter, being referred to non-ITO-based films), such as silver (Ag)-based and copper (Cu)-based transparent conductive films, as low-resistance transparent conductive films instead of the ITO film, is now required.

DISCLOSURE

Technical Problem

Therefore, the present invention has been made in view of the above problems, and it is an object of the present invention to provide a touch sensor using both a projected capacitive (PCAP) method and an electro-magnetic resonance (EMR) method in a display device.

It is another object of the present invention to provide a touch panel sensor using a copper mesh structure as a low-resistance transparent conductive film as a substitute for an ITO film in a display device.

Technical Solution

In accordance with the present invention, the above and other objects can be accomplished by the provision of a touch sensor using both a projected capacitive (PCAP) method and an electro-magnetic resonance (EMR) method using a copper mesh, the touch sensor including a panel unit capable of performing touch recognition using both the PCAP method and the EMR method and a sensor unit configured to determine a touch method when the panel unit is touched and to perform the touch recognition depending on the touch method, wherein the panel unit includes a first panel operated in the PCAP method and a second panel operated in the EMR method, and the sensor unit includes a first panel driving unit configured to operate the first panel, a second panel driving unit configured to operate the second panel, and a control unit configured to detect a change in capacitance of the first panel through the first panel driving unit, to detect a change in a magnetic field of the second panel through the second panel driving unit, and to determine the change in the capacitance and the change in the magnetic field so as to determine whether to operate the first panel driving unit or the second panel driving unit simultaneously or selectively, wherein electrode patterns of the first panel or an antenna loop pattern of the second panel are formed as the copper mesh.

The touch sensor may further include an insulating layer provided between the first panel and the second panel.

The first panel may include an upper film including a plurality of electrode patterns disposed in an X-axis direction by a designated distance thereon, and a lower film including a plurality of electrode patterns disposed in a Y-axis direction by a designated distance thereon, and the second panel may include a film including the antenna loop pattern disposed thereon.

The first panel driving unit may supply current to an electrode formed on the first panel so as to operate the first panel, and the second panel driving unit may supply current to the antenna loop pattern formed on the second panel so as to operate the second panel.

The control unit may alternately operate the first panel driving unit and the second panel driving unit so as to prevent malfunction in the touch recognition due to interference between the first panel and the second panel.

Advantageous Effects

The touch sensor according to the present invention has the effect of using both the projected capacitive (PCAP) method and the electro-magnetic resonance (EMR) method in a display device.

Further, the touch sensor according to the present invention has the effect of using the PCAP method and the EMR method without interfering with each other.

In addition, the touch sensor according to the present invention, when one of the PCAP method and the EMR method is used, blocks execution of the other, thereby being capable of power consumption in the display device.

MODE FOR INVENTION

Figure 1:
FIG. 1 is a view illustrating the structure of a panel unit being capable of using both a projected capacitive (PCAP) method and an electro-magnetic resonance (EMR) method according to one embodiment of the present invention.

Advantages and features of the present invention and methods for achieving the same will become apparent from the descriptions of aspects herein below with reference to the accompanying drawings.

However, the present invention is not limited to embodiments disclosed herein and may be implemented in various different forms.

In the following description of the embodiments, these embodiments are provided to make the description of the present invention thorough, and to fully convey the scope of the present invention to those skilled in the art.

It is to be noted that the scope of the present invention is defined only by the claims.

Therefore, in the following description of several embodiments, a detailed description of known functions, operation and technologies incorporated herein will be omitted when it may make the subject matter of the present invention rather unclear.

Further, in the following description of the embodiments, the same elements are denoted by the same reference numerals even when they are depicted in different drawings, and the terminology used (stated) herein is for the purpose of describing particular exemplary embodiments only and is not intended to be limiting.

In the following description of the embodiments, singular expressions may encompass plural expressions unless they have clearly different contextual meanings, and a term, such as "comprising (or including)", is to be interpreted as indicating the presence of an element or an operation stated in the description or combinations thereof, and do not exclude the presence of one or more other elements, operations or combinations thereof, or the possibility of adding the same.

All terms (including technical and scientific terms) used in the following description have meanings which may be understood in common by those skilled in the art to which the present invention pertains, unless defined otherwise.

Further, terms which are defined in generally used dictionaries are not ideally or excessively interpreted unless defined otherwise.

Hereinafter, an exemplary embodiment of the present invention will be described with reference to the accompanying drawings.

FIG. 1 is a view illustrating the structure of a panel unit being capable of using both a projected capacitive (PCAP) method and an electro-magnetic resonance (EMR) method according to one embodiment of the present invention.

The panel unit according to the present invention includes a protective layer A, a first panel 10, a second panel 20 and a display panel 30.

The protective layer A serves as a layer configured to protect the panel unit, and is cover glass.

The first panel 10 is a layer configured to recognize touch using the projected capacitive (PCAP) method, and includes an electrode which may sense change in capacitance.

Here, the protective layer A and the first panel 10 may be adhered to each other using an optically clear adhesive (OCA) provided between the protective layer A and the first panel 10.

The second panel 20 is a layer configured to recognize touch using the electro-magnetic resonance (EMR) method, and includes an antenna loop pattern which may sense a change due to electro-magnetic resonance.

The touch recognized by the first panel 10 or the second panel 20 is displayed on the display panel 30.

Here, an insulating layer may be additionally provided between the first panel 10 and the second panel 20.

The panel unit according to the present invention includes the projected capacitive-type panel including the electrode formed as a mesh using a metal instead of the conventional transparent electrode using indium tin oxide (ITO) so as to be mainly used in display devices, such as an electronic board, other than mobile terminals.

The mesh-type metal electrode may use silver or copper (Cu), and in the present invention, the mesh-type electrode is formed using copper in consideration of manufacturing costs.

The first panel 10 having a mesh-type copper electrode structure will be described below in detail with reference to FIGS. 2 and 3.

Figure 2:
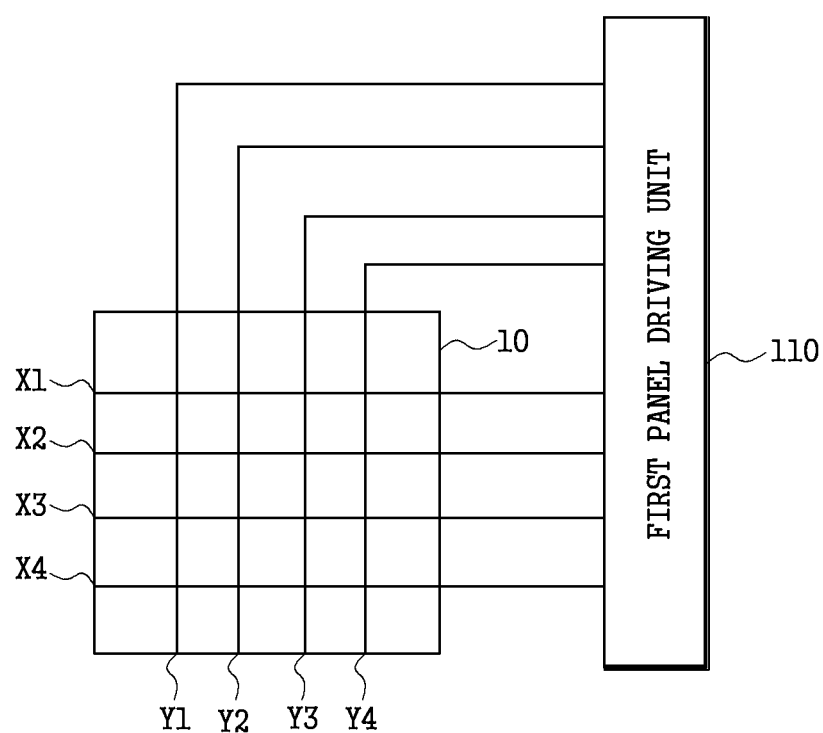
FIGS. 2 and 3 are views illustrating a projected capacitive (PCAP)-type first panel including an electrode formed as a mesh according to one embodiment of the present invention.
Figure 3:
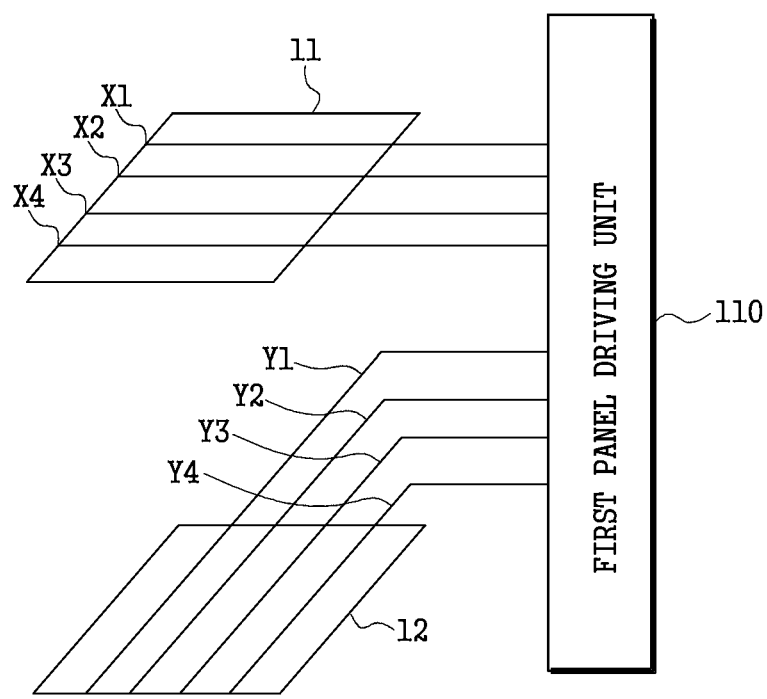

FIGS. 2 and 3 are views illustrating the projected capacitive (PCAP)-type first panel including an electrode formed as a mesh according to one embodiment of the present invention.

As shown in FIGS. 2 and 3, the first panel 10 is configured such that electrode patterns are formed in a mesh structure. The first panel 10 includes an upper film 11 on which a plurality of electrode patterns is disposed in an X-axis direction by a designated distance, and a lower film 12 on which a plurality of electrode patterns is disposed in a Y-axis direction by a designated distance.

The electrode patterns on the upper and lower films intersect each other to form the mesh structure.

As described above, the electrode patterns are formed of a metal, and silver or copper may be used as the metal.

When silver is used, the electrode patterns are formed by printing using silver ink and, when copper is used, the electrode patterns are formed by plating.

Here, when the electrode patterns are formed using silver or copper, the electrode patterns are generally formed to have a thickness of 2-6 micrometers in order to increase transmittance, but because the electrode patterns are dimly visible as seen close up or seen from the side and a starburst effect due to external strong light and the lattice-shaped electrode is seen with the naked eye, the electrode patterns may be formed to have a thickness equal to or less than 1 micrometer in order to avoid the moiré effect due to pixel interference in a high-resolution display.

Here, the electrode patterns formed in the X-axis direction on the upper film 11 and the electrode patterns formed in the Y-axis direction on the lower film 12 are connected to a first panel driving unit 110.

The first panel driving unit 110 provides electricity to the electrode patterns of the first panel 10 so that the first panel 10 may recognize touch in the projected capacitive (PCAP) method.

Here, although not shown in the drawings, an insulating layer is additionally provided between the upper film 11 and the lower film 12.

Here, the structure of the second panel 20 is not described, and a panel including an antenna board having an antenna loop pattern operated in the electro-magnetic resonance (EMR) method, which is generally used, may be used as the second panel 20. The antenna loop pattern may be formed in a mesh type plated with copper.

Figure 4:
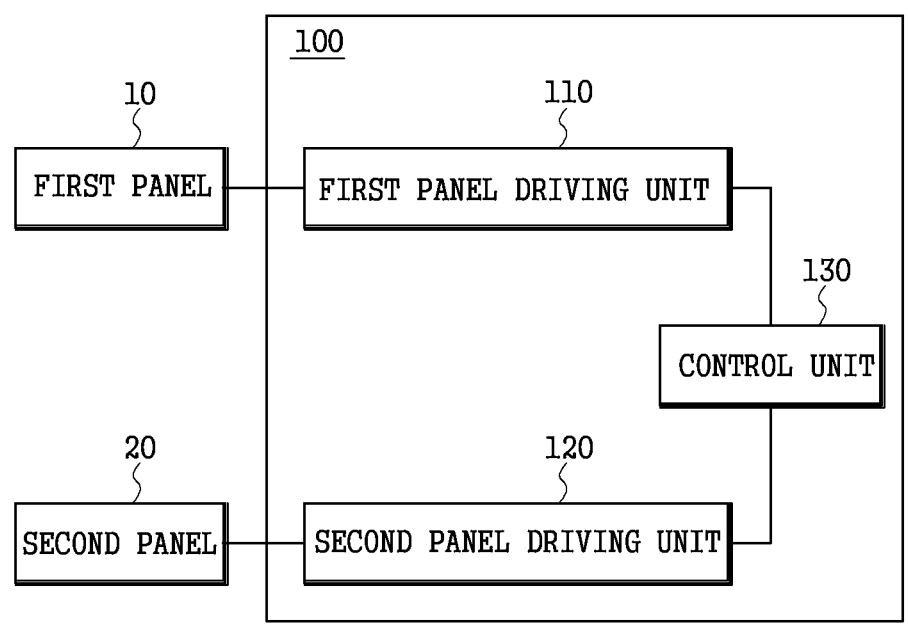
FIG. 4 is a block diagram illustrating the structure of a sensor unit according to one embodiment of the present invention.

FIG. 4 is a block diagram illustrating the structure of a sensor unit according to one embodiment of the present invention.

A sensor unit 100 according to the present invention includes the first panel driving unit 110, a second panel driving unit 120, and a control unit 130.

The first panel driving unit 110 supplies current to the first panel 10 so that the first panel 10 may recognize touch in the projected capacitive (PCAP) method.

That is, the first panel driving unit 110 is connected to the electrode patterns formed on the first panel 10, supplies current to the electrode patterns, detects a change in capacitance occurring when the electrode patterns are touched, and determines the position of the touch of the first panel through analysis of such a change.

The second panel driving unit 120 supplies current to the second panel 20 so that the second panel 20 may recognize touch in the electro-magnetic resonance (EMR) method.

That is, the second panel driving unit 120 is connected to the antenna loop pattern formed on the second panel 20, supplies current to the electrode patterns, detects a change in a magnetic field due to electro-magnetic resonance occurring when the antenna loop pattern is touched by a stylus pen, and determines the position of the touch of the second panel through analysis of such a change.

The control unit 130 detects a change in the capacitance of the first panel 10 through the first panel driving unit 110, detects a change in the magnetic field of second panel 20 through the second panel driving unit 120, and determines the change in the capacitance and the change in the magnetic field so as to determine whether to simultaneously or selectively operate the first panel driving unit 110 and the second panel driving unit 120.

For example, when the control unit 130 senses a change in the capacitance of the first panel 10, the control unit 130 controls the second panel driving unit 120 so as to stop supply of current from the second panel driving unit 120 to the second panel 20, and when the control unit 130 senses a change in the magnetic field of the second panel 20 due to electro-magnetic resonance, the control unit 130 controls the first panel driving unit 110 so as to stop supply of current from the first panel driving unit 110 to the first panel 10.

Therefore, the control unit 130 may control the first panel 10 and the second panel 20 so as to operate any one of the first panel 10 and the second panel 20.

The reason for this is that, when any one panel is operated (i.e., any one panel is touched by a user's hand or a stylus pen), operation of the other panel is blocked so as to prevent malfunction in which a touch position is erroneously determined due to interference of the other panel with the panel which is being operated.

Further, the control unit 130 may alternately operate the first panel driving unit 110 and the second panel driving unit 120 so as to prevent malfunction in touch recognition due to interference between the first panel 10 and the second panel 20. Here, because a user may perform touch by hand and then perform touch using a stylus pen, an operating time, i.e., a time for which the first panel driving unit 10 and the second panel driving unit 10 are alternately operated, may be within 1 second so that touch of the panel unit by the user's hand or the stylus pen may be sufficiently recognized.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A touch sensor using both a projected capacitive (PCAP) method and an electro-magnetic resonance (EMR) method using a copper mesh, the touch sensor comprising a panel unit capable of performing touch recognition using both the PCAP method and the EMR method and a sensor unit configured to determine a touch method when the panel unit is touched and to perform the touch recognition depending on the touch method, wherein:
the panel unit comprises:
a first panel operated in the PCAP method; and
a second panel operated in the EMR method,
the sensor unit comprises:
a first panel driving unit configured to operate the first panel;
a second panel driving unit configured to operate the second panel; and
a control unit configured to detect a change in capacitance of the first panel through the first panel driving unit, to detect a change in a magnetic field of the second panel through the second panel driving unit, and to determine the change in the capacitance and the change in the magnetic field so as to determine whether to operate the first panel driving unit or the second panel driving unit simultaneously or selectively,
wherein electrode patterns of the first panel and an antenna loop pattern of the second panel are formed as the copper mesh, and
wherein the control unit controls the second panel driving unit so as to stop supply of current to the second panel when it senses a change in the capacitance of the first panel, and the control unit controls the first panel driving unit so as to stop supply of current to the first panel when it senses a change in the magnetic field of the second panel.

2. The touch sensor according to claim 1, further comprising an insulating layer provided between the first panel and the second panel.

3. The touch sensor according to claim 1, wherein:
the first panel comprises an upper film comprising a plurality of electrode patterns disposed in an X-axis direction by a designated distance thereon, and a lower film comprising a plurality of electrode patterns disposed in a Y-axis direction by a designated distance thereon; and
the second panel comprises a film comprising the antenna loop pattern disposed thereon.

4. The touch sensor according to claim 3, wherein:
the first panel driving unit supplies current to an electrode formed on the first panel so as to operate the first panel, and the second panel driving unit supplies current to the antenna loop pattern formed on the second panel so as to operate the second panel.

5. The touch sensor according to claim 1, wherein the control unit alternately operates the first panel driving unit and the second panel driving unit so as to prevent malfunction in the touch recognition due to interference between the first panel and the second panel.

* * * * *